June 5, 1945.     C. F. CHADDOCK     2,377,673
BLADE GUIDE FOR MOTOR DRIVEN CIRCULAR HAND SAWS
Filed Aug. 21, 1944     2 Sheets-Sheet 1
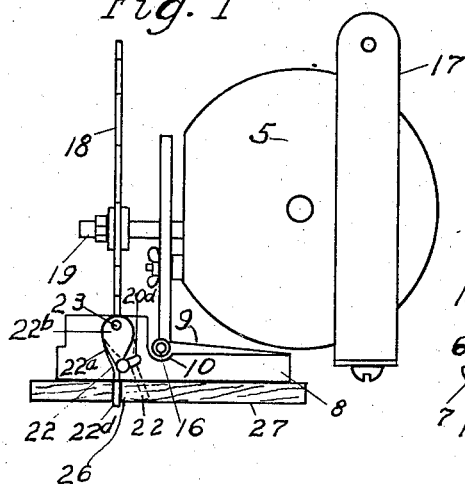
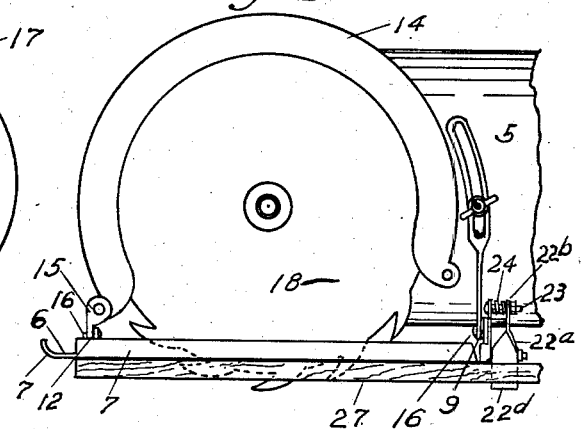
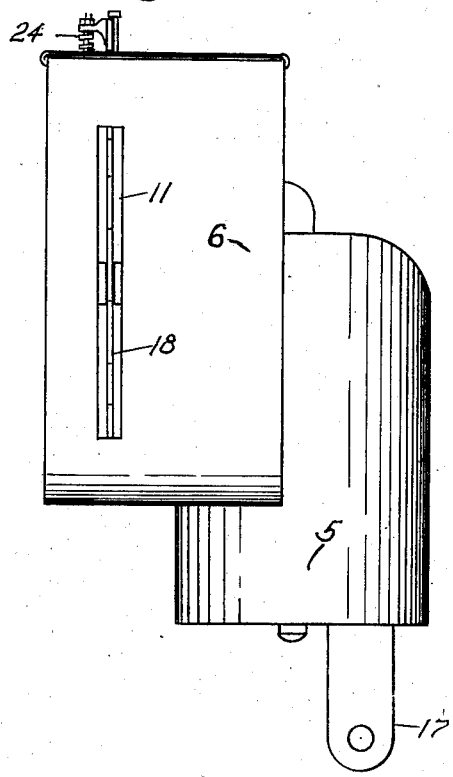
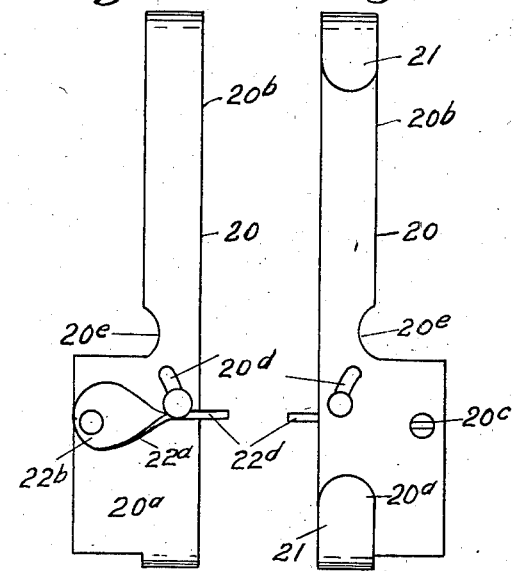
INVENTOR.
Clarence F. Chaddock
BY A. F. Fisher
Atty June 5, 1945.  C. F. CHADDOCK  2,377,673

BLADE GUIDE FOR MOTOR DRIVEN CIRCULAR HAND SAWS

Filed Aug. 21, 1944  2 Sheets-Sheet 2

INVENTOR.
Clarence F. Chaddock
BY A. E. Fisher
Atty

Patented June 5, 1945

2,377,673

UNITED STATES PATENT OFFICE 2,377,673

BLADE GUIDE FOR MOTOR-DRIVEN CIRCULAR HANDSAWS

Clarence F. Chaddock, Los Angeles, Calif.

Application August 21, 1944, Serial No. 550,432

3 Claims. (Cl. 143—43)

This invention relates to an attachment in the way of a blade guide for a portable, motor-driven hand-saw equipped with a circular cutting blade and mounted upon a flat base plate formed with an elongated slot through which the blade protrudes to the work, the saw blade and motor driving the same being pivotally supported in mounting elements in such manner that the blade may be tilted laterally to or from the perpendicular for the purpose of sawing at any desired angle or bevel, within a limited range, such saw being of the conventional "skilsaw" type.

The primary object of the invention is to provide an attachment for mounting transversely at the rear of the base plate of a saw of the kind referred to, the said attachment having a guide finger pivotally mounted on the outer side thereof adapted for positioning for following through along the saw cut as formed by the forwardly moving saw blade, as means for guiding the blade straightly ahead and in a straight line as the tool travels forwardly over the work.

Another object of the invention is to provide for a portable hand saw of the kind referred to, the same including and being mounted upon a flat and elongated and longitudinally slotted base plate through which the circular blade projects to the work, and the said base plate having an upturned rear flange—an elongated attachment bar formed at its ends with clips adapted to frictionally engage the ends of the said upturned rear flange of the base plate and formed along its upper edge to accommodate and clear the structural features and elements of the tool, and a guide finger adjustably pivoted at its upper end to the upper margin of the attachment bar, the lower end of the finger extending below the lower edge of the attachment bar and formed and adapted to follow along through the saw cut, as means for maintaining the saw blade in a straight away course through the work, and whether the saw blade is set for perpendicular cutting or for angular or bevel cutting.

With the stated objects in view, together with such other objects and advantages as may appear from the specification, attention is directed to the drawings as showing a preferred embodiment of the invention and wherein:

Figure 1 is a rear end elevation of a portable, motor driven, circular hand-saw as located upon a piece of work in the process of sawing the same, and having my improved blade guide attachment mounted on the rear end thereof, the adjustable guide finger of the attachment being positioned as for following through perpendicularly along the saw cut as formed by the tool, and thus directing the saw straightly ahead, the angular adjustability of the guide finger being indicated in dotted lines, as required for bevel cuts.

Figure 2 is a side elevation of the rear end portion of the assembly as indicated in Figure 1.

Figure 3 is a bottom plan view of the assembly indicated in Fig. 1.

Figure 4 is an outer side view of the blade guide attachment as removed from the saw or tool.

Figure 5 is an inner side view of the blade guide attachment as removed from the saw or tool.

Figure 6:
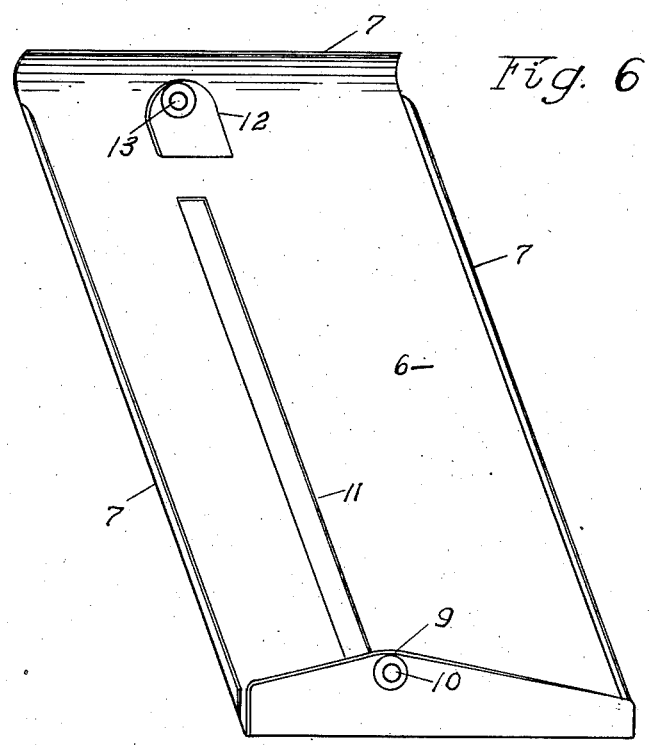
Figure 6 is a perspective view on an enlarged scale of the oblong base plate comprising one element of a conventional circular hand-saw, and upon the rear upturned margin of which my invention is mounted.
Figures 7, 8:
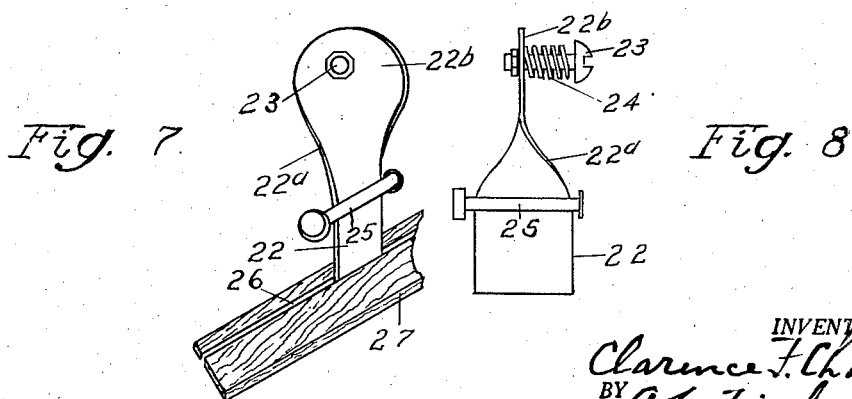
Figure 7 is a detail in perspective and on an enlarged scale of the blade guide finger as positioned within a saw-cut formed in the work.
Figure 8 is a side elevation on the scale of Figure 7 of the blade guide finger as removed from its attachment bar.

This invention is designed for mounting upon any conventional form of portable, motor driven, circular hand-saw, such as here represented generally at 5, and sometimes referred to as a "skilsaw."

Such a saw comprises a flat, oblong base plate 6, rectangular in form, and having its margins turned up angularly all around, as indicated at 7 and 8. The rear upturned margin 8 is of substantial height as shown, and is cut angularly across its upper edge at the left end of the element as indicated at 9. Through the apex of this angular margin is formed a shaft receiving bore 10, the same being in a line cutting perpendicularly the said plate 6 and passing through the elongated saw-slot 11 at the rear end of the said slot, this slot being conventionally formed along through the left side of the base plate in parallelism with the lateral margin thereof.

A bracket 12 is mounted to the forward end of the base plate 6 in longitudinal alignment with the saw-slot 11, this bracket being also formed with a shaft receiving bore 13 disposed in exact longitudinal alignment with the bore 10 of the upturned rear margin 8.

The saw unit as such comprises the usual casing 14 elongated in form and pivotally mounted at its ends between the forward bracket 12 and upturned rear margin 8 of the base plate, by means of the elements 15 extended from the ends of the casing and secured by means of short bolts 16 passed through the said elements and through the bores 10 and 13, all in usual manner. The casing 14 is provided with a handle 17 rearwardly extended, and a motor driven circular saw 18 is keyed on the outer end of a drive shaft 19 and disposed at the left side of the casing 14, the said saw blade being protruded down through the slot 11 of the base plate to the desired extent for engaging the work. The shaft 19 is extended transversely into the casing and is operated by an electrical motor mounted therein, the same being not here shown in detail, being conventional.

The invention itself comprises an elongated attachment bar 20, preferably flat in form and including at its ends the inwardly turned clips 21 adapted to slide over and frictionally grip the ends of the upturned rear margin or flange 8 of the base plate 6, whereby it is held securely in place at the rear end of the base plate. In this mounting the bights of the said clips pass down between the upturned ends of the rear margin 8 and the lateral margins 7 forming thereat open corners on the base plate. The left end of the bar 20 is of substantially greater width than the right end, as indicated at 20a and 20b, and the wider end 20a is pierced through by a pivot pin hole 20c and by an arcuate and horizontally extended slot 20d, both located in a plane passed vertically therethrough and medially through the slot 11 of the base plate 6. The otherwise elongated and relatively narrow right end 20b of the bar 20 may be further cut away and reduced immediately at its juncture with the widened left end 20a, to provide a bolt head clearance 20e, adapted to clear the outer end of the rear bolt 16 when the device is mounted in place.

A blade guide finger 22 is formed of a short length of flat and narrow strip material, preferably of metal, the end portions thereof being twisted and turned ninety degrees relative to one another, as indicated at 22a. The upper end 22b of this finger is disposed flatly at the outer side of the widened left end 20a of the bar 20, in an outwardly spaced relation to the bore or hole 20c, and the finger is then pivotally secured to this end of the bar 20 by means of a short stud or pin 23 which is passed through the hole 20c and through the upper end of the finger 22. This upper end of the finger is prevented from buckling inward to the bar by means of a small, expansive coil spring 24, which is seated over the stud and braced at its ends between the bar and the upper end of the finger. The lower end 22c of this finger then extends vertically down the end 20a in a perpendicular relation thereto, and across the arcuate slot 20d, the lower extremity of the finger being extended somewhat below the lower edge of the bar 20, as indicated at 22d, in the drawings. A stop pin 25 is soldered transversely upon the finger 22 in alignment with the slot 20d, the inner end of this pin being projected freely through the said slot. Thus the lower extremity 22d of the finger may be moved back and forth along the arcuate slot 20d, and is adapted to serve as a thin guide point or tip for following along through the saw cut 26, as the same is formed in and along the work piece 27 by the circular saw blade 18 working through the slot 11 of the base plate 6, as the tool is pushed forwardly over the work. Thus the cutting may be directed straightly and regularly through the work. Because of the outward press of the spring 24 the free lower end of the finger is maintained in proper contact and alignment with the bar 20, and this spring also serves to frictionally hold the finger to any position of adjustment to which it may be set, either perpendicularly to the base plate 6, or angularly to either side of the perpendicular, as may be required for bevel-cutting the work.

In the use of this attachment, the saw blade is merely set to the desired cutting angle in the customary manner, and the saw is started into the work in the desired direction and angle. When the saw blade penetrates into the work sufficiently to clear the margin thereof, the lower guide tip of the guide finger is moved and set into the mouth of the saw-cut, where it is held frictionally as stated. Thereafter the saw is moved forwardly and the guide tip of the guide finger follows along through the cut and directs the saw blade straightly through the work.

While I have here shown and described a certain embodiment of the invention and have shown specific structural features thereof, the embodiment shown as well as the specific features thereof, may be changed as desired, within the scope of the claims.

I claim:

1. In a device of the kind described, for attachment at the rear end of the base plate of a conventional portable, motor-driven hand-saw equipped with a circular saw blade, a flat and elongated attachment bar provided with clips at its ends for frictionally engaging the upturned rear margin of the base plate of the saw for transversely mounting the bar thereto, the said bar being formed at its upper margin to conform to the configurations and structural features of the tool on which it is mounted, a guide finger pivoted at its upper end to the upper margin of the attachment bar in operative alignment with the saw blade, the lower extremity of this finger being depended below the lower edge of the attachment bar and formed as a pointed guide tip adapted to follow along through the saw cut as formed by the travel of the blade through the work.

2. In a device according to claim 1, there being an arcuate slot formed through the attachment bar in vertical alignment below the point of pivotal connection of the finger with the said bar, and a stop pin anchored transversely to the finger in alignment with the said arcuate slot, the inner end of the said pin being extended through the slot as means for limiting the movement of the guide finger along the slot.

3. In a device of the kind described, a flat and elongated attachment bar formed with clips at its ends for frictionally engaging the ends of the upturned rear flange of the base plate of a conventional portable, motor driven hand-saw of the "skilsaw" type, a guide finger pivoted at its upper end to the upper margin of the attachment bar rearwardly of and in operative alignment with the saw blade, the lower extremity of this finger being depended below the lower edge of the attachment bar and formed as a pointed guide tip adapted to follow along through the saw cut as formed by the travel of the saw through the work, there being an arcuate slot formed through the attachment bar in vertical alignment below the point of pivotal connection of the guide finger with the bar, a stop pin secured transversely to the guide finger with the inner end of the pin extended through the said arcuate slot as means for limiting the lateral movement of the finger, and means for holding the guide finger to any adjusted position relative to said arcuate slot.

CLARENCE F. CHADDOCK.